March 7, 1967  J. D. BARR ETAL  3,307,267
METHOD AND APPARATUS FOR ASSESSING THE COORDINATES
OF THE CENTRE OF A ROUGHLY CIRCULAR FORM
RELATIVE TO A FIXED AXIS
Filed Dec. 19, 1963

INVENTORS
John D. Barr
Richard E. Reason
Peter Frederick Thomas Cryer
Stillwell
By Pierre Scheffler & Parker
Attorneys United States Patent Office 3,307,267
Patented Mar. 7, 1967

3,307,267
METHOD AND APPARATUS FOR ASSESSING THE COORDINATES OF THE CENTRE OF A ROUGHLY CIRCULAR FORM RELATIVE TO A FIXED AXIS
John D. Barr and Richard E. Reason, Leicester, and Peter Frederic Thomas Cryer Stillwell, Aldershot Hampshire, England, assignors to The Rank Organisation Limited, London, England, a British company
Filed Dec. 19, 1963, Ser. No. 331,892
Claims priority, application Great Britain, Dec. 19, 1962, 47,990/62
5 Claims. (Cl. 33—174)

In measurement it is sometimes important to be able to ascertain the co-ordinate position of, for instance, the centre of a hole in a metal surface relative to a fixed axis which may form part of a measuring machine. The co-ordinates of the centre of a circular hole could be found for instance by mounting an electrical transducer sensitive to contact on the axis traversing the surface in two directions at right angles and noting the positions of contact. From these four measurements the co-ordinates of the centre could be calculated if the form were truly circular, but any deviations from true circular form would introduce error. In precision measurements such errors are intolerable.

According to one aspect of the present invention there is provided apparatus for determining the co-ordinates of the centre of an approximately circular form, such as the form of the surface of a shaft or a hole lying in a predetermined plane, relative to a predetermined system of co-ordinates, comprising means for sensing said form in a predetermined plane to generate an electrical signal, means for extracting the fundamental component of said electrical signal, and means for determining the amplitude of said fundamental component at predetermined points associated with said system of co-ordinates.

According to a further aspect of the present invention there is provided a method of determining the co-ordinates of the centre of an approximately circular form, such as the form of the surface of a shaft or a hole lying in a predetermined plane, relative to a predetermined system of co-ordinates, comprising the steps of sensing said form in said predetermined plane to generate an electrical signal, extracting the fundamental component of said electrical signal, and determining the amplitude of said fundamental component at predetermined points associated with said system of co-ordinates.

Figure 1:
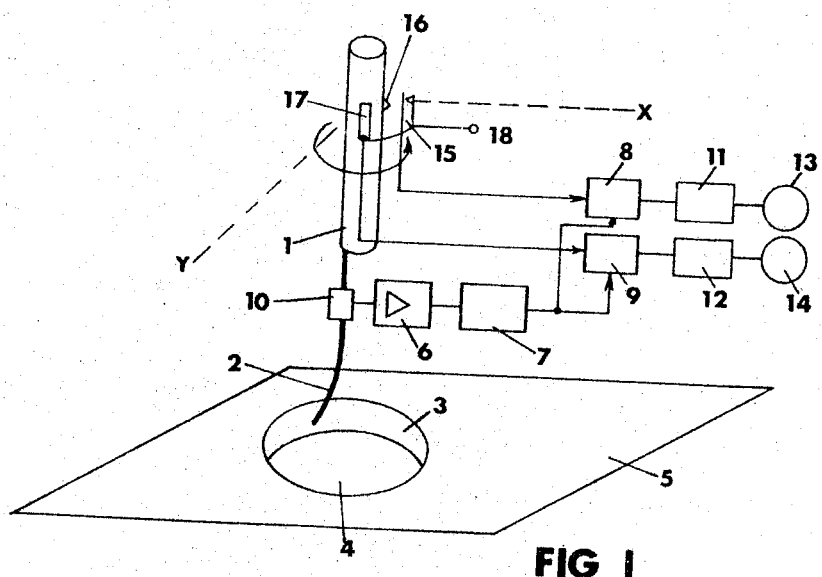
Figure 2:
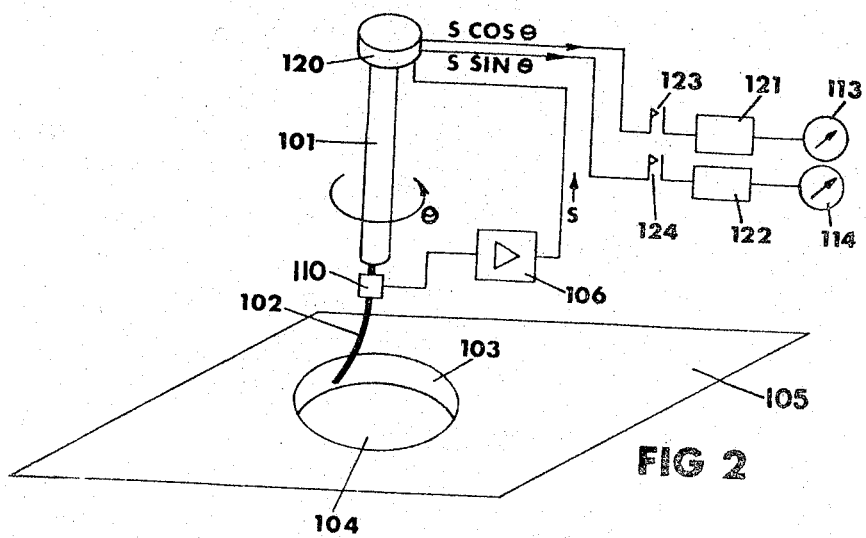

In order to make the invention clearly understood, reference will now be made to the accompanying diagrammatic drawings which are given by way of example and in which:

FIGURE 1 illustrates one form of an apparatus for determining the co-ordinates of the centre of an approximately circular hole; and FIGURE 2 illustrates a modified form of the apparatus of FIGURE 1.

The apparatus of FIGURE 1 comprises a spindle 1 carrying an electrical stylus 2 which forms part of a transducer 10 and which is adapted for feeling around the inner circumference surface 3 of a hole 4 in a workpiece or the like 5. The signal from the transducer 10 may consist of a D.C. signal representing the mean output of the transducer 10, together with a series of harmonically related signals which specify the form of the surface 3 of the hole 4, the signal being amplified in an amplifier 6. If the angular frequency of the stylus 2 is $w$ the signal can be represented by:

$S = A + B \sin(wt+a) + C \sin(2wt+b) + D \sin(3wt+c)$ and so on; where $a$, $b$ $c$, and so on, are constants representing phase angles.

The fundamental term $B \sin(wt+a)$ defines the eccentricity between the projection of the axis of the spindle 1 and the centre of the hole at the plane containing the track of the feeling stylus 2. This fundamental frequency can be selected from the total signal by means of an electrical filter 7 and the filtering process shifts the phase of the fundamental signal by a fixed angle so long as the rotational frequency is constant. Now if the spindle 1 is arranged so that at two points at right angles during a rotation separate electrical pulses are generated, these pulses can be used as diagrammatically shown at 8 and 9, to sample the amplitude of the fundamental component emerging from the filter 7. These sampled voltages can be stored for instance in capacitor or other stores 11 and 12, and displayed on meters 13 and 14 which are scaled to display the X and Y co-ordinates of the true centre of the hole 4. The sampling pulses can be generated by a number of means for instance, by providing a commutator on the spindle shaft 1, or, as shown in FIGURE 1, by using a cam 16 which momentarily closes two contact-pairs 15 and 17 at the desired time points so as to produce sampling pulses from a voltage source 18.

There is a slight disadvantage in the method of operation of the apparatus of FIGURE 1, in that it is necessary for the stylus to perform a few revolutions before the final measurement indication is achieved. This is because the filter 7 will have a transient response and must be allowed to settle before correct readings are obtained.

In a more elaborate but quicker operating apparatus, as shown in FIGURE 2, a rotatable spindle 101 is provided which carries an electrical transducer 110 having a stylus 102 for feeling around the inner circumference surface 103 of a hole 104 in a workpiece 105. The signal from the transducer 110 is amplified in an amplifier 106 and applied to a sincos potentiometer 120 operated by the spindle 101. The potentiometer 120 produces outputs which are proportional to the transducer signal multiplied by $\sin \theta$ and $\cos \theta$. More specifically, potentiometer 120 which is of conventional construction produces one output which is proportional to the product of the amplitude of the signal generated by the transducer and the sine of the angle of rotation of the spindle 101, and also a second output which is proportional to the product of the amplitude of the transducer generated signal and the cosine of the angle of rotation of the spindle. Where $\theta$ is the angle between the stylus 102 and an arbitrary radius of the spindle 101 actually defined by the orientation of the body and wipers of the potentiometer 120 relative to the stylus 102. The sin and cos signals from the potentiometer 120 are then integrated in two separate integrating circuits 121 and 122. Now if the outputs from the integrators 121 and 122 are observed on meters 113 and 114 at the end of any whole number of revolutions of the spindle 101 they will be proportional to the X and Y co-ordinates of the centre of the hole 104 relative to perpendicular axes meeting at the axis of the spindle 101 and with orientation determined by the relative phasing of the stylus 102 and the body and wipers of the potentiometer 120.

In a practical arrangement for obtaining the X and Y co-ordinates of a hole relative to a spindle axis it is advantageous if signals are allowed to enter the integrators 121 and 122 during only one revolution of the spindle 101. The spindle would be rotating continuously at a constant angular velocity and the signals from the potentiometer gated into the integrators for a single revolution by automatic switching means indicated diagrammatically at 123 and 124. The spindle 101 must rotate with constant angular velocity since the integration is with respect to time and the circuit components must be chosen to match this velocity.

The wipers of the potentiometer 120 may be connected to the spindle 101 at any angle relative to the stylus 102 and the body of the potentiometer 120 can then be rotated to line up the measurement axes with the axes of a table upon which the workpiece 105 is mounted.

The above two apparatus are concerned with measuring the X and Y co-ordinates of the centre of a hole—or of course, a shaft relative to a spindle, but the polar co-ordinates can be measured if desired by other methods. For instance, the amplitude of the fundamental waveform emerging from the filter 7 of FIGURE 1 defines the eccentricity error between the projection of the axis of the spindle 1 and the centre of the hole 4, while the phase of this waveform relative to a reference phase obtained from for instance a generator mounted on the spindle defines the angular error $\theta$, and can be mesured by known phase-measurement techniques.

Once it is possible to obtain accurate co-ordinates for the centre of a hole or shaft relative to a fixed axis it is possible to determine the truth of the extension of this hole or shaft. Thus if the co-ordinates of the centre are found at two points along the shaft or hole length by making measurements with two different extensions of the stylus, then by simple geometry the true co-ordinates of the centre at any other point may be calculated, and subsequently tested by measurement.

What we claim is:

1. An apparatus for determining the co-ordinates of the centre of an approximately circular form, such as the form of the surface of a shaft or a hole lying in a predetermined plane, relative to a predetermined system of co-ordinates, comprising a feeler for sensing said approximately circular form, rotatable spindle means mounting the feeler for rotation about an axis located within said approximately circular form in a known position relative to said system of co-ordinates for sensing said approximately circular form, a transducer mounted on said spindle and connected to said feeler for generating an electrical signal containing a fundamental component representative of the eccentricity of the centre of said approximately circular form, a filter connected with the output of said transducer for separating said fundamental component from the remainder of the signal generated by said transducer during a given revolution of said feeler, sampling means coordinated respectively to each of two different sampling points located 90° apart around the axis of rotation of said feeler in a known position relative to said system of co-ordinates, means connecting the output from said filter to each of said sampling means, switching means coordinated respectively to said sampling means for controlling the operating instants thereof, said switching means being mounted for actuation in succession at said sampling points by rotation of said spindle means, and means connected to the respective outputs of said sampling means for indicating the respective amplitudes of said fundamental component at said locations of said different sampling points during the same revolution of said feeler in which said fundamental component is separated out from the remainder of the signal generated by said transducer.

2. Apparatus as claimed in claim 1 and which further includes signal storage means disposed between the outputs of said sampling means and said indicating means.

3. Apparatus as claimed in claim 1 wherein separate indicating means are included for indicating the respective amplitudes of said fundamental component at said locations of said different sampling points and which further includes signal storage means disposed between the output of each said sampling means and the said indicating means connected thereto.

4. An apparatus for determining the co-ordinates of the centre of an approximately circular form, such as the form of the surface of a shaft or a hole lying in a predetermined plane, relative to a predetermined system of co-ordinates, comprising a feeler for sensing said approximately circular form, rotatable spindle means mounting the feeler for rotation about an axis located within said approximately circular form in a known position relative to said system of co-ordinates for sensing said approximately circular form, a transducer mounted on said spindle and connected to said feeler for generating an electrical signal containing a fundamental component representative of the eccentricity of the centre of said approximately circular form, a sine-cosine potentiometer connected to said transducer to receive said generated signal and which is operated in timed relation with rotation of said spindle, said potentiometer producing during a given revolution of said feeler a first output proportional to the product of the amplitude of the signal generated by said transducer and the sine of angle of rotation of said spindle and also producing during that same feeler revolution a second output proportional to the product of the amplitude of said transducer generated signal and the cosine of the angle of rotation of said spindle, integrating circuits connected respectively to said first and second outputs, and means connected respectively to said integrating circuits for indicating the respective outputs thereof during the same revolution of said feeler as produces the outputs from said potentiometer.

5. An apparatus for determining the co-ordinates of the centre of an approximately circular form, such as the form of the surface of a shaft or a hole lying in a predetermined plane, relative to a predetermined system of co-ordinates, comprising a feeler for sensing said approximately circular form, rotatable spindle means mounting said feeler for rotation about an axis located wthin said approximately circular form in a known position relative to said system of co-ordinates for sensing said approximately circular form, a transducer mounted on said spindle and connected to said feeler for generating an electrical signal containing a fundamental component representative of the eccentricity of the centre of said approximately circular form, means connected to the output from said transducer for separating said fundamental component from the remainder of the signal generated by said transducer during a given revolution of said feeler, means establishing two different sampling points located a predetermined distance apart around the axis of rotation of said feeler in a known position relative to said system of co-ordinates, and means determining the amplitude of said separated out fundamental component at said sampling points during the same revolution of said feeler in which said fundamental component is separated out from the remainder of the signal generated by said transducer.

References Cited by the Examiner

UNITED STATES PATENTS

| | | | |
|---|---|---|---|
| 3,222,791 | 12/1965 | Huntely et al. | 33—174 |
| 3,245,148 | 4/1966 | Whitney | 33—174 |

LEONARD FORMAN, *Primary Examiner.*

S. S. MATTHEWS, *Assistant Examiner.*